April 18, 1961   H. J. C. NIEUWENHOVEN ET AL   2,980,006
AUTOMATIC PROCESSING DEVICE FOR CUT PHOTOGRAPHIC FILMS
Filed July 1, 1957                                                                 2 Sheets-Sheet 1

INVENTORS
H. J. C. Nieuwenhoven
G. L. A. Monte
BY M. C. Brech

Wenderoth, Lind & Ponack
Attys

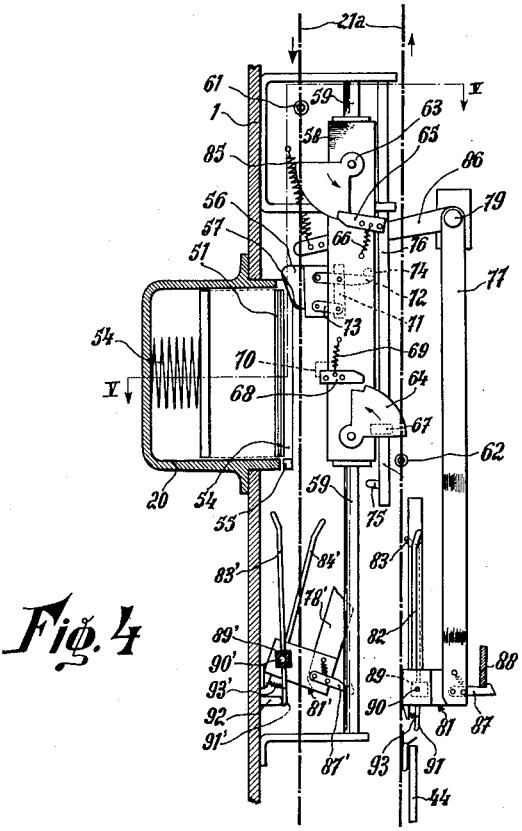
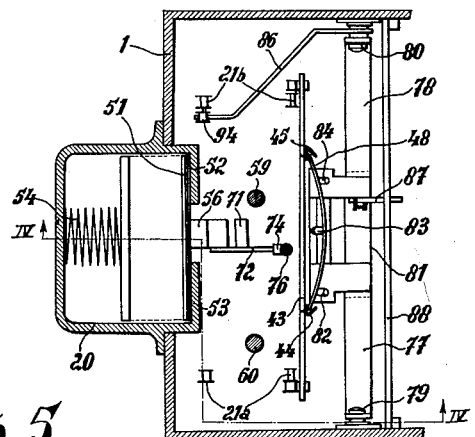

United States Patent Office 2,980,006
Patented Apr. 18, 1961

2,980,006

AUTOMATIC PROCESSING DEVICE FOR CUT PHOTOGRAPHIC FILMS

Hendricus Jacobus Cornelis Nieuwenhoven, Rijswijk, George Leendert Adriaan Monte, Tilburg, and Hubertus Johannes Marinus Christina Brech, Breda, Netherlands, assignors to N.V. Optische Industrie "De Oude Delft," Delft, Netherlands Filed July 1, 1957, Ser. No. 669,287

Claims priority, application Netherlands July 7, 1956

1 Claim. (Cl. 95—90)

The invention relates to the automatic processing of photographic films and more particularly to an apparatus for the processing of so-called cut film, i.e. films having substantially equal width and length.

Automatically operating units for processing large numbers of cut films, e.g. X-ray fluoroscopic films, are known in the art. In general their arrangement is such that the cut films to be processed are inserted one by one by an operator into individual film frames adapted to be conveyed through the machine, the frames thereby being lowered successively into a number of tanks containing the required photographic solutions, e.g. for developing, fixing and washing of the films. In addition the film frames containing the cut films may be conveyed through a drying compartment of the machine and, finally, the dried films are removed by the operator from their film frames. In some machines of the type referred to the cut films are positioned in the film frames in a separate dark room and to this end the frames may be removed from the machine. In other arrangements the frames are not detachably connected to their conveying means in the processing machine and therefore the films must be inserted into the frames at the machine itself. Various types of conveying means may be used, e.g. conveyor chains or belts or feed screws carrying the film frames, or combinations thereof.

It is one object of the invention to provide an apparatus of the type referred to which is fully automatic in operation. It is another object of the invention to provide a processing unit which may be operated in full daylight. A still further object is an automatic processing machine for cut films in which the developed films are made available for a preliminary inspection at an early time during the course of automatic processing.

These and other objects and advantages of the invention will be apparent from the following detailed description of a preferred embodiment shown in the accompanying drawings in which:

Figures 4 and 5 are two views of the film loading arrangement for use in the machine illustrated in Figue 1;

Identical parts in different figures are indicated by identical reference numbers.

Figure 1:
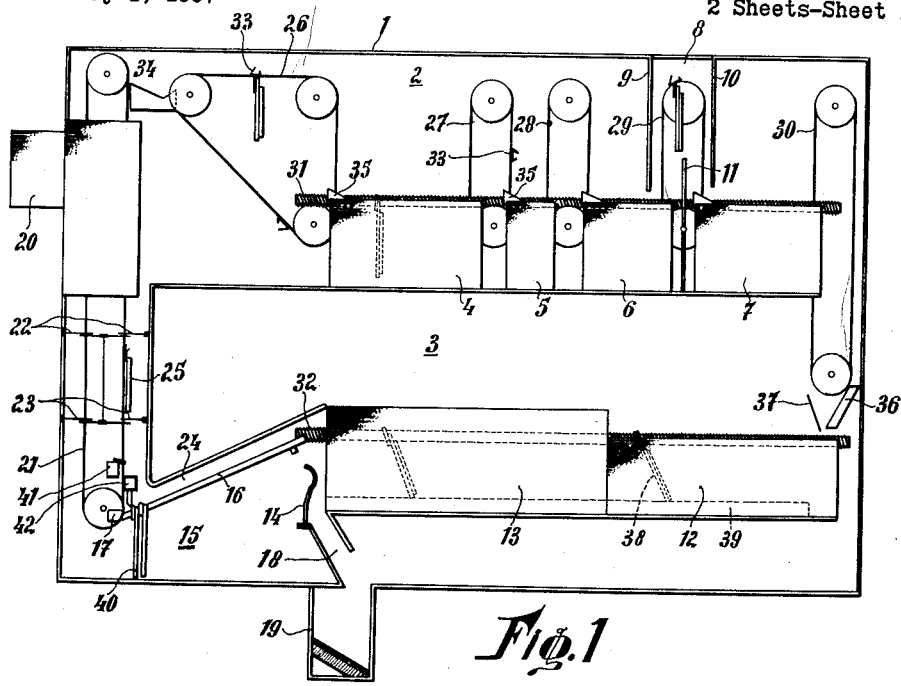
Figure 1 is a general schematic view of a processing apparatus constructed in accordance with the invention.

Referring to Figure 1 the apparatus schematically illustrated therein comprises a housing 1 having two compartments, i.e. an upper compartment 2 which is completely light-tight and a lower compartment 3 which is not. In the light-tight compartment 2 a developing tank 4, a stop bath tank 5 and a first fixing tank 6 are situated. A second fixing tank 7 is placed next to the first one on the light side of a partition 8 which is so designed as to allow the film frames after desenitizing of the film in the first fixing tank 6 to be passed on to the second fixing tank 7 without disturbing the light-tightness of the developing compartment 2.

The light lock consists of two plates 9, 10 hanging down from the top wall of housing 1 and an intermediate plate 11 extending to a certain length between the plates 9, 10. It will be understood that by arranging a light lock between the two fixing tanks 6 and 7 the films are made available for a preliminary inspection at an early time, as may be of great importance e. g. in medical X-ray diagnosis. In the lower compartment 3 a washing tank 12 and a drying tunnel 13 are situated, as well as a device 14 for removing the films from the frames and a buffer magazine 15 for empty frames. This magazine consists of a pair of rails 16 so disposed under an angle that empty frames supplied from the drying tunnel 13 may slide towards the lower end of the rails until they are stopped by a stop member 17 or by a preceding frame. The films fall down through a guiding 18 and are collected in a magazine 19. An electromagnetically operated locking device 42 may be provided for preventing empty film frames from being removed from the frame magazine 15 when no films are available for processing, as will be further explained hereinafter.

A film loading device which will be described in greater detail with reference to Figures 4 and 5 is arranged in the left hand part of the light-tight compartment 2. It comprises a film magazine 20 detachably mounted on the lateral wall of the housing 1 and a pair of conveyor chains or belts 21, which lift empty film frames from the frame magazine 15 up to the film magazine 20 and which further operates a number of mechanical parts of the loading device in the required timed sequence. When lifted by the conveyor chain 21 the film frames pass a light lock consisting of sets of flexible flaps 22, 23 arranged at a mutual distance which is slightly greater than the height of one frame If not actuated by the frames the flaps overlap each other and intercept practically all of the incident light. It is to be understood that no light can reach the light lock directly since a partition 24 is provided to shut off such light. As the light can enter compartment 15 only via the drying tunnel 13 or the guiding passage 18 the light-tightness of the compartment 2 is sufficiently secured by the flaps 22, 23.

Figure 2:
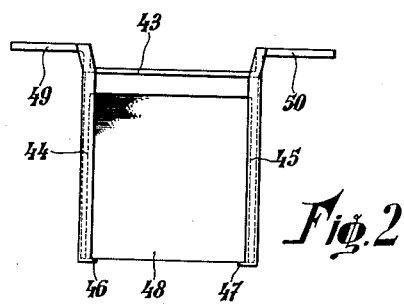
Figure 2 and Figure 3 are two more views of the film frames.
Figure 3:
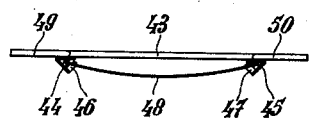

The film frames, such as 25, 38 and 40, of which an arbitrary number have been shown in Figure 1 in various points of their course, are lifted and lowered by means of a number of twin conveyor chains or belts 21, 26, 27, 28, 29 and 30, and are conveyed in horizontal direction by twin feed screws 31 and 32. The chains or belts are provided with hooks, such as those designated 33 on conveyor belt 27, and 27 which in operation engage lateral tips 49, 50 of the frames (Figures 2 and 3). One pair of feed screws 31 is used to provide for the horizontal feed of the frames in the row of tanks in the upper part of the machine and the other for the displacement of the frames in the washing tank 2 and the drying tunnel 13. It will be understood that all conveyor elements may conveniently be driven by one single motor via a number of suitable transmissions (not shown in the drawing) in order to maintain under all circumstances the exact relations required between the frame movements in various stages of the processing.

As shown in Figures 2 and 3 film frames are used which are very simple in construction and consist of a metal rod 43 of U-shaped configuration to which a pair of strips 44 and 45 are fixed in parallel relation. The strips have a V-shaped cross-section and thereby form grooves receiving the lateral edges of the cut film 48. Their mutual distance is such that the film must be slightly curved when loading the frame and the film is retained by the frame during the processing due to its inherent elasticity.

In Figures 4 and 5 there is illustrated a preferred embodiment of the loading mechanism, it being understood that various parts, shown in Figure 4 have been omitted in Figure 5 for the sake of clarity. The film magazine 20 is detachably mounted to the wall of the housing 1 and contains a stack of exposed cut films 51. The stack of films is held pressed against the edges 52 and 53 of the magazine by a spring 54. A slot 55 is arranged in the bottom of the magazine and its width exceeds only slightly the thickness of one cut film. A reciprocating finger 56 is provided with a small rim 57, adapted to engage the rear edge of the foremost film in the stack 51, each time when the finger 56 is passed along the film magazine 20 in a downward direction in a manner further to be described hereinafter. Thus, periodically the foremost film is pushed down by the finger 56 and leaves the magazine through the slot 55.

Finger 56 is connected to a carriage 58 which can slide up and down along vertical guiding rods 59 and 60 under the control of notches 61 and 62 on the conveyor chain 21a. This chain has been indicated in Figure 4 by a dot and dash line. To this end notches 61 and 62 are cooperating with rotatable segment pawls 63 and 64 mounted to the upper and lower parts of the carriage 58 respectively. The horizontal edges of the segments are in the paths of the notches 61 and 62. The segments 63 and 64 are provided with small torsion springs (not shown) tending to prevent rotation of the segments in anti-clockwise direction out of the positions shown in Figure 4. A pawl 65 which is loaded by a spring 66 tending to rotate the pawl clockwise locks the segment 63 in this position and is withdrawn only when it abuts against a fixed stop 67 in the lowermost position of the carriage. Likewise a rotatable pawl 68 loaded by spring 69 is provided for preventing the other segment 64 from rotating anti-clockwise until a fixed stop 70 lifts the pawl 68 in the uppermost position of the carriage 58 as shown. A set of friction springs (omitted from the drawing for clarity) may be provided for retaining the carriage 58 in fixed position with respect to the rods 59, 60 as long as no force is exerted thereon by the chain 21a.

When the carriage 58 is periodically moved up and down finger 56 describes a rectangular path. As explained above during the downward stroke of the carriage rim 57 of finger 56 engages the upper edge of the first film in the film magazine. During the upward stroke the finger must be retracted a small distance, however, so as to prevent the films from being scratched by the sharp edge of rim 57. This is accomplished in the following manner. Finger 56 is pivotably suspended to a fixed part 71 of the carriage 58 by means of two parallel levers 72 and 73. It will be appreciated that these levers, together with the finger 56 and the part 71 define a kind of collapsible parallelogram, such that the free width between the parts 56 and 71 may be varied by rotating the lever 72. The latter lever has an extension which engages stops 74 and 75 on a rod 76 at the upper and lowermost points of the stroke of the carriage 58. A click spring may be provided which holds the finger 56 fixed in its forward or retracted position during the downward and upward strokes respectively of the carriage 58.

Double swaying arms 77, 78 are rotatably suspended at 79 and 80. They carry at their free ends a gripper element, generally designated 81 and having three prongs 82, 83 and 84. The swaying arms tend to be rotated clockwise under the action of a spring 85 which is connected to a lever 86 secured to the swaying arm 78 for simultaneous rotation therewith. Such rotation is prevented by a spring-loaded pawl 87 which is pivotably connected to the gripper element 81 and is held engaged by a transverse bar 88. Pawl 87 may be released by an electromagnet (not shown) which is energized through an electric contact of switch 41 (Figure 1). Thus, each time switch 41 is operated the swaying arms 77, 78 are permitted to rotate anti-clockwise until the gripper element 81 takes the inward position also shown in Figure 4. The reference numbers of the various parts of the gripper element in this position are indicated by accents in Figure 4.

The outermost prongs 82 and 84 have a fixed position with respect to the arms 77, 78 whereas the intermediate prong 83 is secured to a block 89 which is pivotable at 90 and has an extension 91 which engages a stop 92 when the swaying arms are near the end of their inward stroke. Thus, the prong 83 is rotated anticlockwise against the tension of a spring 93 and a V-shaped space is formed for receiving a cut film emerging from the magazine 20 and falling down by its own weight. The free end of the lever 86 is disposed in the path of a notch 94 (see Figure 5) on the second conveyor chain 21C and thus the arms 77, 78 may be returned to the vertical position by the chain. It will be understood, that by suitably locating the notches on the conveyor chains 21a and 21C it is possible to have the functions described performed in the required timed sequence. When the swaying arms 77, 78 are returned to the vertical position the intermediate prong 83 retakes its original position relative to the outer prongs under the action of spring 93, and the film 48 is gently clamped in curved form between the prongs as may be seen in Figure 5. Pawl 87 snaps behind the bar 88 and the swaying arms wait for the next pulse from microswitch 41 to repeat the above functions.

The function of the constructional details shown in Figures 6 and 7 will be explained in the following description of the operation of the complete apparatus.

A stack of cut films is inserted in the film magazine 20 and the driving motor of the machine is started. The lowermost frame in the frame magazine 15 is picked up by a pair of hooks on the conveyor chains 21 and is lifted up to the film loading device through the light locks 22, 23. The frame operates a microswitch 41 having a contact through which an electro-magnetic relay (not shown) in the film loading device is energized which is capable to rotate the segment 63 a small angle clockwise against the action of a torsion spring into the locked position shown in Figure 4. A notch 61 on the conveyor chain 21a engages the upper edge of the segment 63 and as the segment is now prevented from pivoting in anticlockwise direction by spring-loaded pawl 65 the carriage 58 is pushed down by the notch 61, the finger 56 thereby shifting one film out of the magazine 20.

It will be appreciated that if no film frame would be available in the magazine 15 the microswitch 41 would not be operated and segment 63 would remain unlocked. Consequently, the notch 61 would be allowed to slip past the segment 63, without carriage 58 being pushed down. The downward movement of the carriage under the action of the notch 61 is limited by a fixed stop 67, which makes the pawl 65 rotate in anti-clockwise direction, thereby permitting the segment 63 to rotate also and to release the notch 61 on conveyor chain 21a. In the meantime, when the empty film frame passed microswitch 41, the latter has also temporarily energized a relay (not shown) which has lifted the pawl 87 so as to permit the swaying arms 77, 78 to rotate clockwise under the action of spring 85. As discussed hereinbefore the gripper is opened and takes up the film as the latter falls down from the magazine.

Then notch 94 on the conveyor chain 21C pushes down the lever 86, arms 77, 78 are rotated back to the vertical position and pawl 87 locks the gripper element again in the position where the film is exactly disposed in the path of the film frame supplied from the frame magazine 15.

The film being given a predetermined lateral curvature by the prongs 82, 83, 84 the strips 44 and 45 of the film frame will just pass along the edges of the film. When the lips 46 and 47 (see Figures 2 and 3) engage the rear edge of the film the latter will be slipped from between the prongs and its edges will snap into the grooves, defined by the strips 44, 45. Then the loaded frame is lifted further by the conveyor chain and is finally disposed into a pair of blocks 34 having an upper surface of V-shaped configuration.

Figure 6:
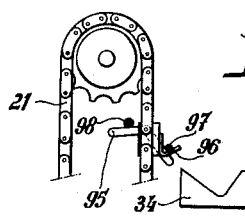
Figures 6 and 7 illustrate some constructional details of the conveying apparatus incorporated in the machine according to Figure 1 which will be described in detail hereinafter.
Figure 7:
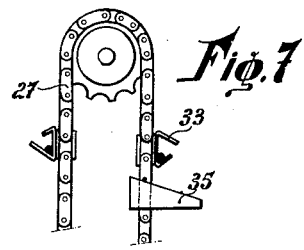

This is accomplished by a pawl mechanism as illustrated in Figure 6. The conveyor chains 21a and 21C are provided with pairs of pivotable levers 95 mounted just below the hooks 96 carrying the frame tips 97. When the left arm of the lever 95 engages the fixed stop 98 the lever is rotated anti-clockwise and the frame is lifted out of the hooks and thrown into the blocks 34.

The frame is then picked up by a second pair of conveyor belts or chains 26 by means of hooks 33. This pair of conveyor chains has for purpose to transfer the frame horizontally until it hangs over the developing tank 4 and to lower it into the tanks.

As explained above, the horizontal displacement of the frames in the developing tank is obtained by means of a pair of parallel feed screws 31, which are driven at identical speeds. The way in which the frames are released from the hooks of the conveyor chains and passed on to the feed screws is illustrated in Figure 7. The hooks 33 consist of metal strips which have been bent twice so as to form a U-shaped member having converging legs of different lengths. Thus the frame tips are prevented from falling out of the hooks when the lift of the frames is changed into a lowering by the upper chain wheel. Pieces such as 35 of substantially triangular shape have been arranged at both sides of the developing tank and in the path of the tips of the frames. When a frame is lowered by the chains 27 the sloping upper edge of pieces 35 engages the laterally extending frame tips and it will be easily understood, that the frames are lifted out of the hooks and will run down along the sloping upper edges of the members 35 so as to be disposed on the feed screws.

It is observed that the transfer of the frames to the stop both tank 5 and the fixing tanks 6 and 7 is effected in a similar manner by conveyor chains 27, 28 and 29 respectively and does not require additional explication. Finally the frames are lifted from the second fixing tank 7 by a pair of conveyor chains 30 and are conveyed to the washing tank situated in the lower part of the machine. A pair of guiding plates 36, 37 ensure that the frames which fall out of the hooks due to the reversal of the chain movement will take the required position on the feed screws 32, which transfer the frames through the washing tank 12 and the drying tunnel 13.

In the washing tank and the drying tunnel a pair of parallel guides 39 are mounted the purpose of which is to force the frames to take a sloping position during their passage as shown in Figure 1. In this way the washing action of water which may be sprayed through a number of apertures in the top of the tank may be very effective. Another result is that the drying of the wet films in the drying tunnel 13 by means of hot air injected from above may be effected in a shorter interval. As the additional means for washing and drying the films are not part of the invention and may be realized in various ways known in the art they are not further illustrated in the drawing.

At the exhaust end of the drying tunnel the films are removed from the frames by means of a rod 14, disposed in the path of the film. When a frame is slipping off the guides 39 it tends to resume its vertical position and the film strikes the rod 14, the striking force being large enough to draw the edges of the film out of the strips 44, 45.

Then the film falls down into the magazine 19 and the empty frame is placed by the feed screws 32 on the sloping rails 16 serving as a magazine.

The pushing finger 56 is returned to its upper position in the following manner.

The notch 62 on the conveyor chain 21a engages the lower segment pawl 64 on the carriage 58 which, in the lowermost position of the carriage, is prevented from pivoting by the spring-loaded pawl 68. Thus the carriage 58 is moved upward by the notch 62 until it reaches its uppermost position. Then pawl 68 is lifted by a fixed stop 70 and notch 62 is permitted to slip past the segment 64 by slightly rotating this segment anti-clockwise. In the meantime at the end of the downward stroke of the carriage 58 the lever 72 to which the finger 57 is pivotably connected has been rotated anti-clockwise by the stop 75 thereby retracting the finger 56 a small distance. In this position the finger is retained during the upward stroke of the carriage. At the end of this stroke the lever 72 is rotated back by the second fixed stop 74 and the finger is forced to resume its operating position as shown in the drawing.

As indicated above the frame magazine 15 is provided with a lock 42. As schematically indicated in Figure 1 this is an electro-magnetically operated finger, whose coil can be energized through an electric contact in the film magazine only when a film magazine has been attached to the machine and contains at least one film to be processed. When no films are available for processing the finger is lowered and the frames are prevented from being picked up by the conveyor chain.

Moreover the frame magazine is preferably a buffer magazine adapted to contain a greater number of film frames than can be effectively in use in the machine at a time. In this way a large number of frames can be withdrawn from the machine for a preliminary examination of the films immediately after the films have been fixed without interrupting the supply of frames to the film loading mechanism.

Thanks to the locking device 42 no empty film frames will be passed through the machine. Without this provision it would be necessary, when stopping the machine, to wait until the last empty frame which has been in one of the photographic baths has passed the washing device, in order to prevent crystallizing of the chemicals on the frames. It is observed that, when the last film to be processed just leaves the fixing tank, the tanks may be emptied, but even then a number of empty frames would have been moistened in the various tanks, if no locking means were provided in the frame magazine.

We claim:

An automatic processing machine for cut photographic films comprising in combination a housing, a first compartment in said housing which in operation is light-tight, a first series of tanks in said light-tight compartment containing processing liquids adapted to completely develop and substantially desensitize said films, a second compartment in said housing which in operation is accessible, a second series of tanks in said accessible compartment containing processing liquids, including fixing and washing liquids, adapted to finish said desensitized films, a plurality of film frames each adapted to receive one cut film, conveying means forming a closed circuit traversing said first and second compartments for automatically advancing said film frames in timed sequence through said first and second series of tanks successively, light-locks between said light-tight and said accessible compartments giving passage to said conveying means carrying said film frames, a magazine for a stack of exposed cut films in said light-tight compartment, automatically operated means in said light-tight compartment for discharging said cut films individually from said film magazine and inserting said discharged films in said film frames, said film frames being loosely suspended on said conveying means whereby said film frames carrying a cut film in the course of processing are removable for preliminary inspection of the developed and desensitized films upon their passage from said light-tight compartment to said accessible compartment.

References Cited in the file of this patent

UNITED STATES PATENTS

| | | |
|---|---|---|
| 2,155,511 | Simjian | Apr. 25, 1939 |
| 2,157,128 | Hershberg | May 9, 1939 |
| 2,196,586 | Grant | Apr. 9, 1940 |
| 2,545,031 | Izzi | Mar. 13, 1951 |
| 2,837,988 | Pavelle | June 10, 1958 |
| 2,852,993 | Applegate | Sept. 23, 1958 |

FOREIGN PATENTS

| | | |
|---|---|---|
| 707,128 | France | Apr. 13, 1931 |